United States Patent
Lunardi et al.

(10) Patent No.: US 12,483,921 B2
(45) Date of Patent: Nov. 25, 2025

(54) RADIO NETWORK NODES, AND METHODS PERFORMED IN A WIRELESS COMMUNICATION NETWORK

(71) Applicant: Telefonaktiebolaget LM Ericsson (publ), Stockholm (SE)

(72) Inventors: Luca Lunardi, Genoa (IT); Angelo Centonza, Granada (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 296 days.

(21) Appl. No.: 18/026,468

(22) PCT Filed: Nov. 2, 2021

(86) PCT No.: PCT/SE2021/051096
§ 371 (c)(1),
(2) Date: Mar. 15, 2023

(87) PCT Pub. No.: WO2022/098281
PCT Pub. Date: May 12, 2022

(65) Prior Publication Data
US 2023/0422076 A1    Dec. 28, 2023

Related U.S. Application Data

(60) Provisional application No. 63/108,973, filed on Nov. 3, 2020.

(51) Int. Cl.
*H04W 28/02* (2009.01)
*H04W 28/08* (2023.01)
*H04W 28/086* (2023.01)

(52) U.S. Cl.
CPC ...... *H04W 28/0226* (2013.01); *H04W 28/086* (2023.05); *H04W 28/0958* (2020.05)

(58) Field of Classification Search
CPC ............ H04W 24/02; H04W 28/0226; H04W 28/086; H04W 28/0958
See application file for complete search history.

(56) References Cited

U.S. PATENT DOCUMENTS

2015/0230113 A1    8/2015  Zhang et al.
2015/0288566 A1*  10/2015  Sadek ............... H04W 28/0236
                                                370/254
2016/0262072 A1*   9/2016  Watanabe ............. H04L 47/125
(Continued)

OTHER PUBLICATIONS

Etsi Ts 136 423 v15.8.0. "LTE; Evolved Untiversal Terrestrial Radio Access Network (E-Utran); X2 Application Protocol (X2AP) (3GPP Ts 36.423 version 15.8.0 Release 15)" Jan. 2020. (Year: 2020).*

(Continued)

*Primary Examiner* — Stephen J Clawson
(74) *Attorney, Agent, or Firm* — Murphy, Bilak & Homiller, PLLC

(57) ABSTRACT

Embodiments herein disclose, for example, a method performed by a first radio network node (12) for handling communication in a wireless communication network. The first radio network node transmits to a second radio network node (13), a request for retrieval of an update indication of measurement upon a potential resource aggregation of one or more cells controlled by the second radio network node (12).

15 Claims, 13 Drawing Sheets

(56) References Cited

U.S. PATENT DOCUMENTS

| | | | |
|---|---|---|---|
| 2017/0006498 A1* | 1/2017 | Matas Sanz | H04W 28/0838 |
| 2019/0020549 A1* | 1/2019 | Kim | H04L 41/0893 |
| 2019/0037417 A1* | 1/2019 | Lei | H04W 36/00698 |
| 2022/0322175 A1* | 10/2022 | Liu | H04W 28/0861 |
| 2023/0044648 A1* | 2/2023 | Centonza | H04W 36/22 |
| 2023/0319554 A1* | 10/2023 | Guo | H04W 12/069 |
| 2023/0413337 A1* | 12/2023 | Wang | H04W 52/0245 |

OTHER PUBLICATIONS

"3GPP TS 36.423 V16.0.0", 3rd Generation Partnership Project; Technical Specification Group Radio Access Network; Evolved Universal Terrestrial Radio Access Network (E-UTRAN); X2 application protocol (X2AP) (Release 16), Dec. 2019, pp. 1-432.

"(TP for SON BL CR for TS 36.423) MLB enhancements", 3GPP TSG-RAN WG3 Meeting #113-e, R3-213816, Online, Aug. 16-26, 2021, pp. 1-16.

"(TP for SON BL CR for TS 36.423, TS 38.423): MLB enhancements", 3GPP TSG-RAN WG3 Meeting #110-e, R3-206511, Online, Nov. 2-12, 2020, pp. 1-10.

"(TP for SON BL CR for TS 38.423): MLB enhancements", 3GPP TSG-RAN WG3 Meeting #111-e, R3-210674, Online, Jan. 25-Feb. 4, 2021, pp. 1-16.

"3GPP TS 36.423 V15.10.0", 3rd Generation Partnership Project; Technical Specification Group Radio Access Network; Evolved Universal Terrestrial Radio Access Network (E-UTRAN); X2 application protocol (X2AP) (Release 15), Jul. 2020, pp. 1-211.

"3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.

"Clarification of the TNL Capacity Indicator", 3GPP TSG-WG3 Meeting #109e, R3-205771, E-meeting, Aug. 17-28, 2020, pp. 1-3.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TS 38.423 V16.2.0", 3rd Generation Partnership Project; Technical Specification Group Radio Access Network; NG-RAN; Xn application protocol (XnAP) (Release 16), Jul. 2020, pp. 1-447.

* cited by examiner

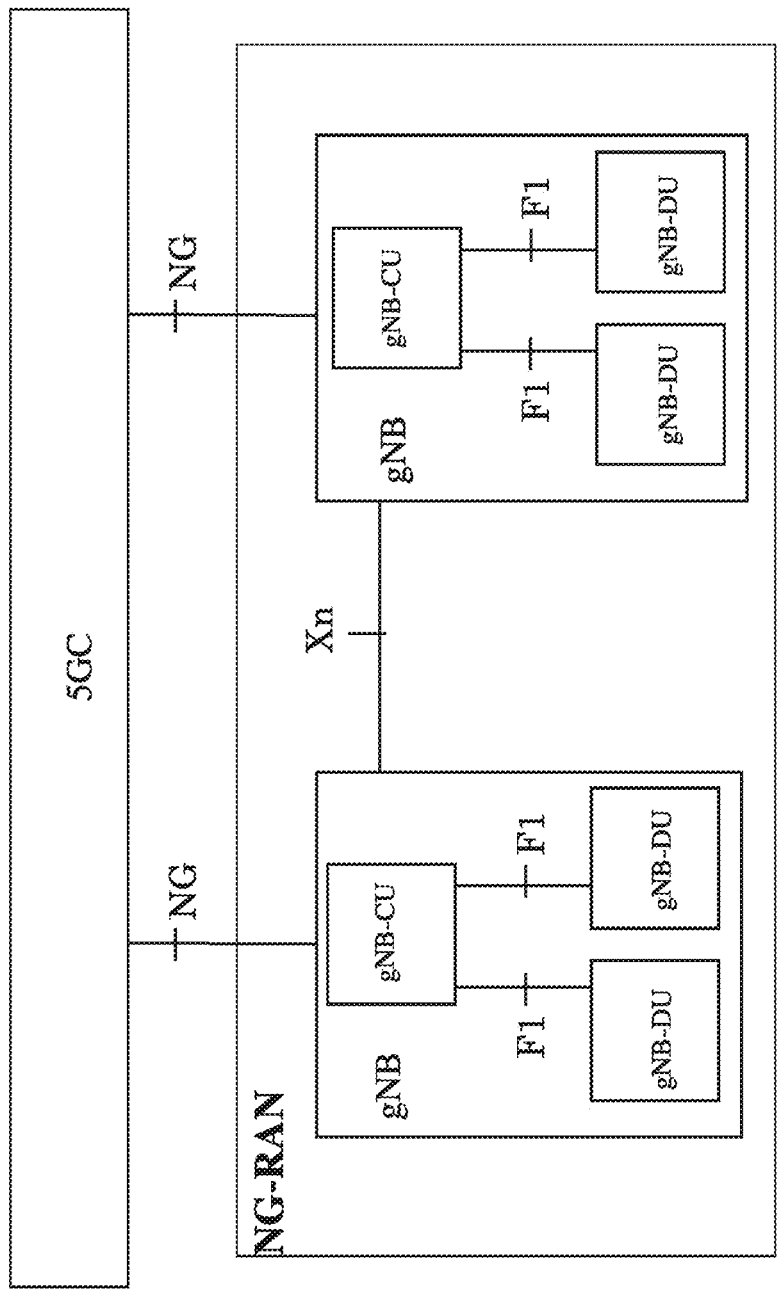
-- Prior Art --  Fig. 1a

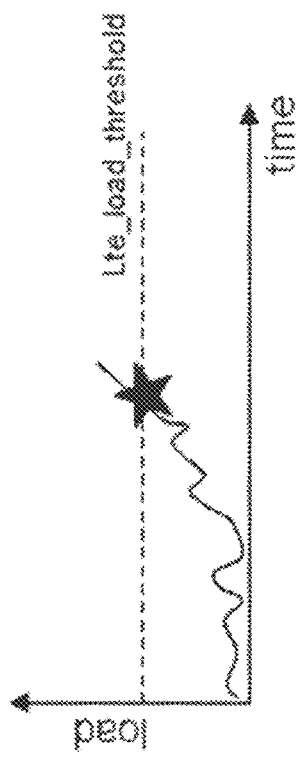
Fig. 1b -- Prior Art --
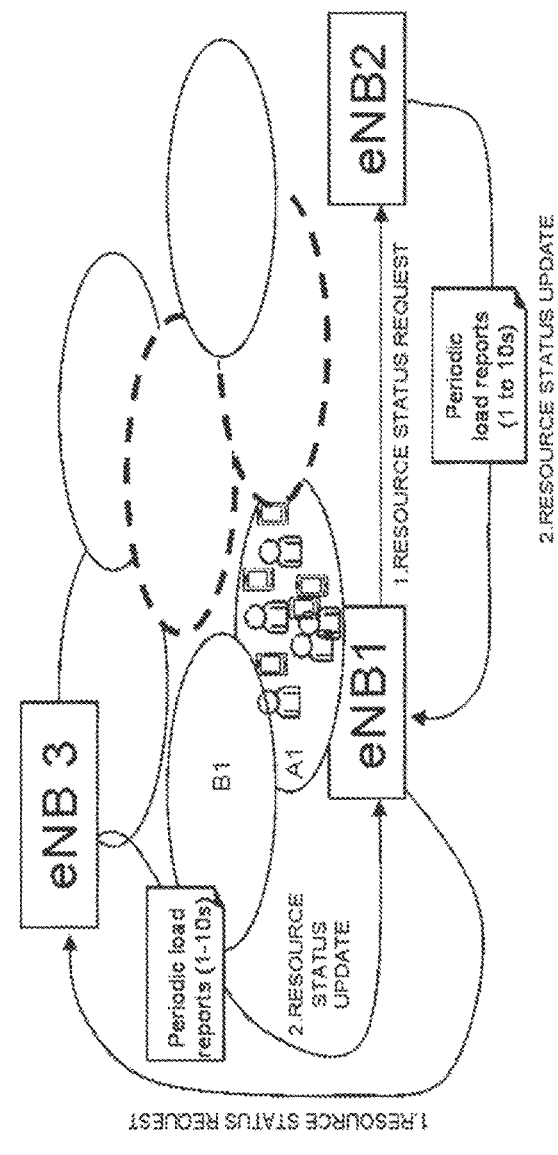
Fig. 1c -- Prior Art --

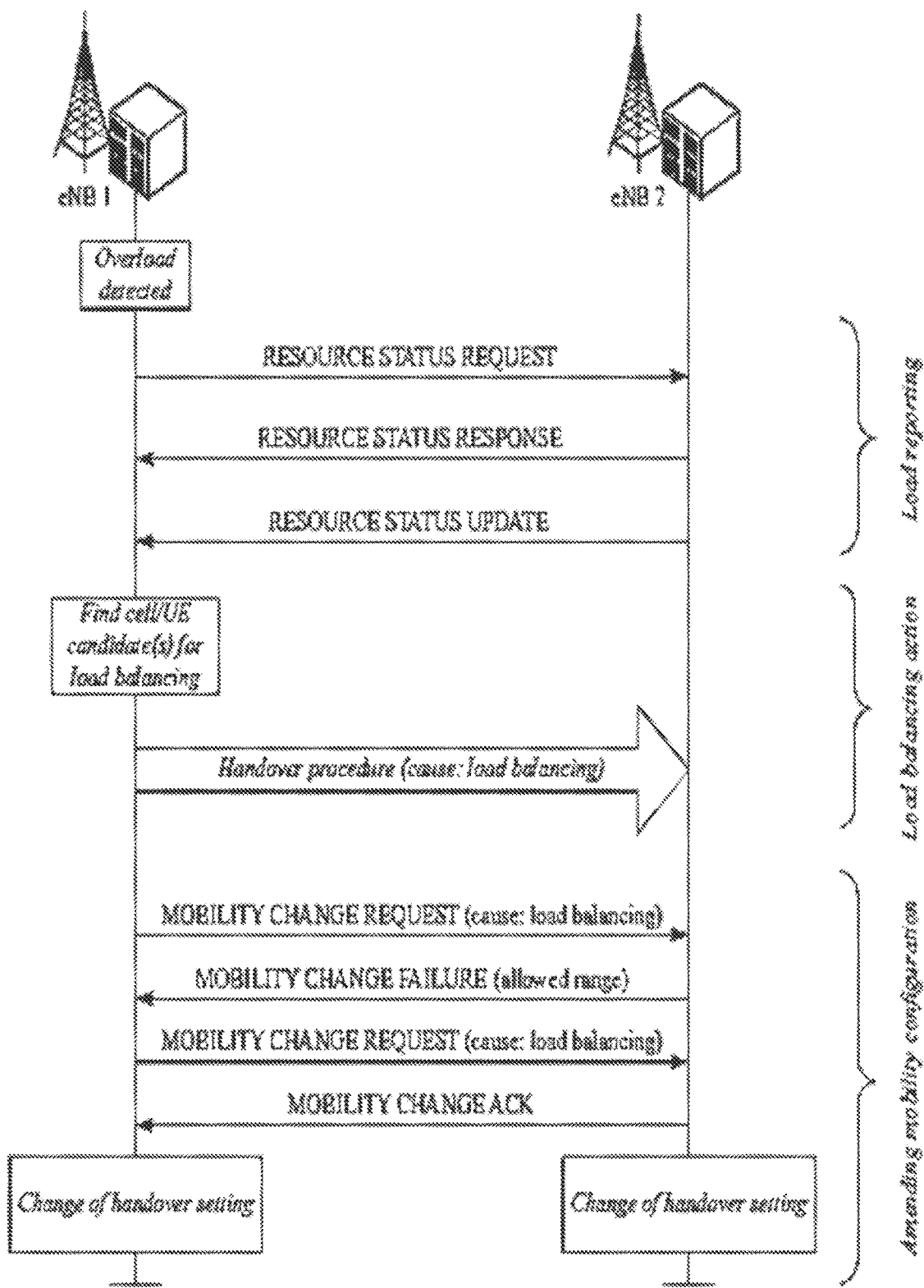
Fig. 1d -- Prior Art --

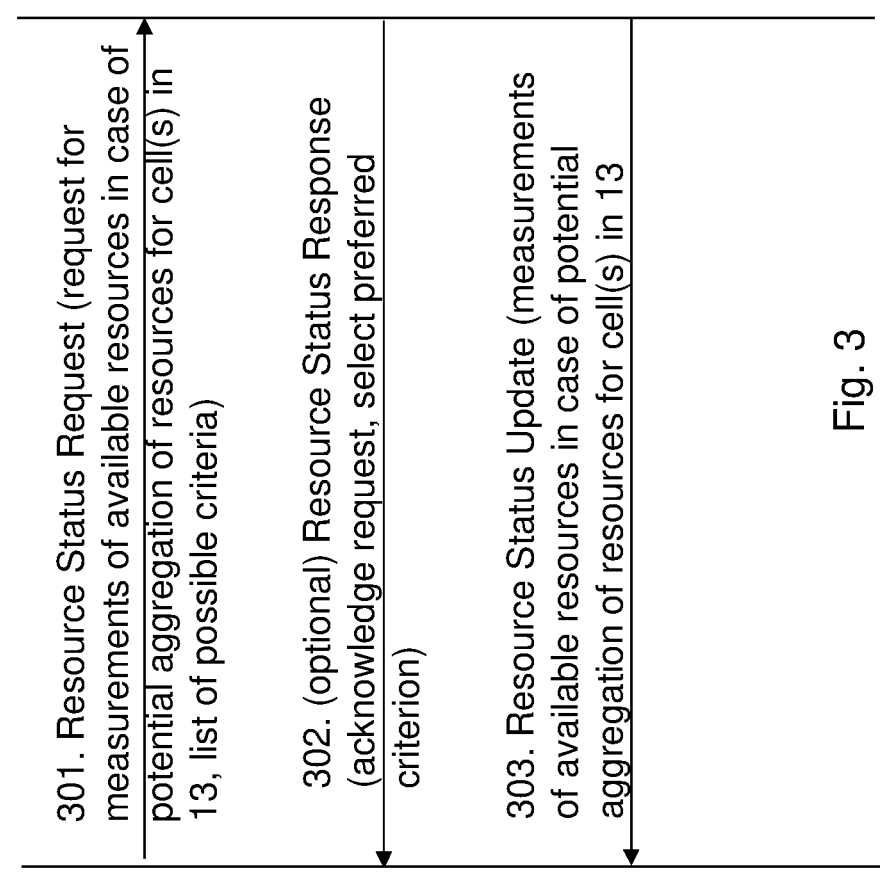
Fig. 3

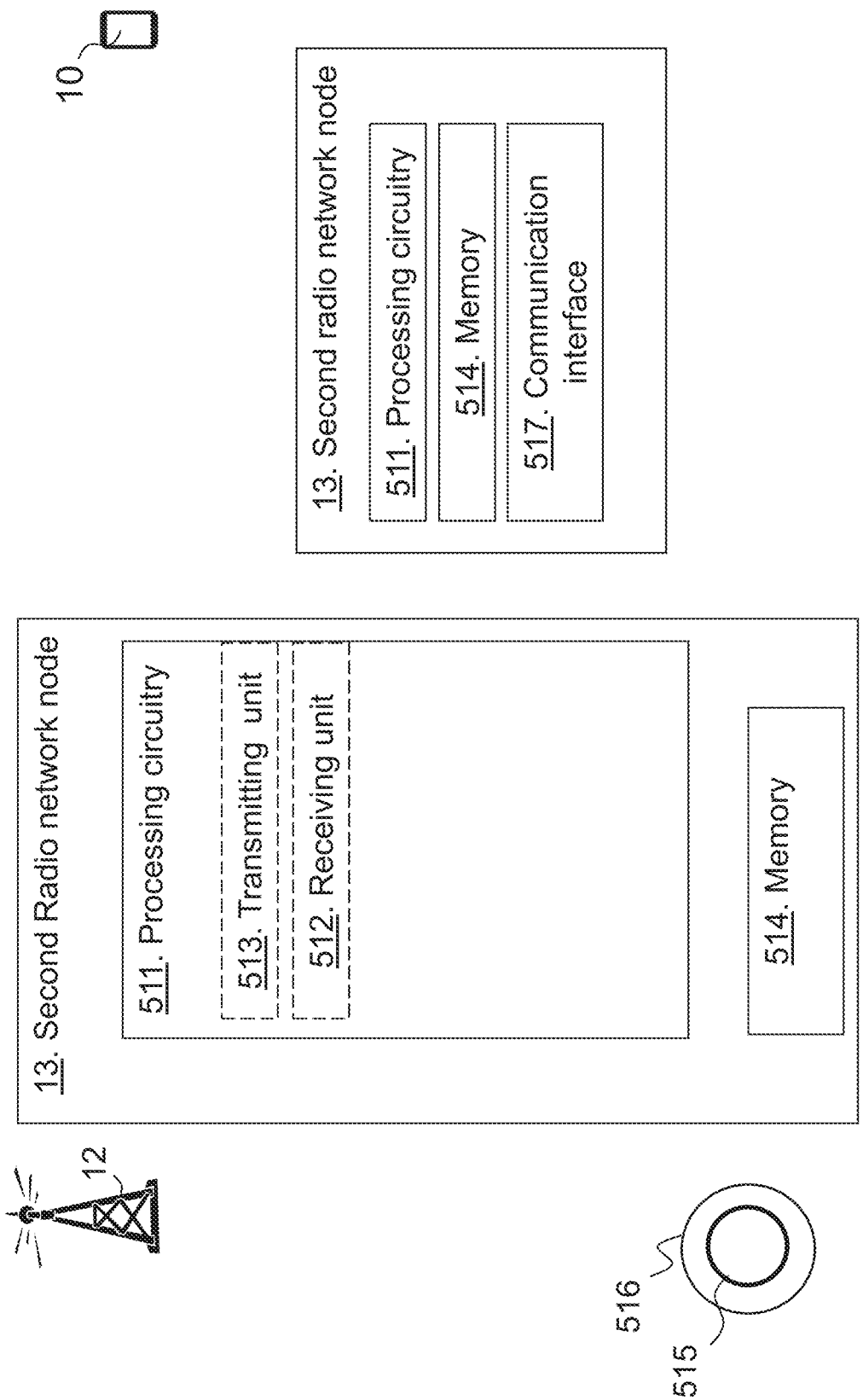

RADIO NETWORK NODES, AND METHODS PERFORMED IN A WIRELESS COMMUNICATION NETWORK

TECHNICAL FIELD

Embodiments herein relate to a first radio network node, a second radio network node and methods performed therein regarding wireless communication. Furthermore, a computer program product and a computer-readable storage medium are also provided herein. Especially, embodiments herein relate to handling or enabling communication, e.g., enabling load balancing, in a wireless communication network.

BACKGROUND

In a typical wireless communication network, user equipments (UE), also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3rd Generation Partnership Project (3GPP) and this work continues in the coming 3GPP releases (Rel). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of, e.g., very many transmit- and receive-antenna elements makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Carrier Aggregation (CA) is generally used in NR (5G) and LTE systems to improve UE transmit receive data rate. With carrier aggregation, the UE typically operates initially on single serving cell called a primary cell (Pcell). The Pcell is operated on a component carrier in a frequency band. The UE is then configured by the network with one or more secondary cell (SCell) or secondary serving cells (Scell(s)). Each Scell can correspond to a component carrier (CC) in the same frequency band, also referred to as intra-band CA, or different frequency band, also referred to as inter-band CA, from the frequency band of the CC corresponding to the Pcell. For the UE to transmit and/or receive data on the Scell(s), e.g., by receiving downlink-shared channel (DL-SCH) information on a physical downlink shared channel (PDSCH) or by transmitting uplink-shared channel (UL-SCH) on a physical uplink shared channel (PUSCH), the Scell(s) need to be activated by the network. The Scell(s) may also be deactivated and later reactivated as needed via activation/deactivation signalling.

The current 5G RAN (NG-RAN) architecture is depicted and described in TS 38.401 v15.4.0 as follows.

FIG. 1a illustrates an Overall 5G RAN architecture. The NG architecture can be further described as follows. The NG-RAN consists of a set of gNBs connected to the through the NG. An gNB can support frequency division duplex (FDD) mode, time division duplex (TDD) mode or dual mode operation. gNBs can be interconnected through the Xn interface. A gNB may consist of a gNB-central unit (CU) and gNB-distributed units (DU). A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to an LTE eNB via the X2 interface. Another architectural option is that where an LTE eNB connected to the Evolved Packet Core network is connected over the X2 interface with a so called nr-gNB. The latter is a gNB not connected directly to a CN and connected via X2 to an eNB for the sole purpose of performing dual connectivity.

The architecture in FIG. 1a can be expanded by spitting the gNB-CU into two entities. One gNB-CU-UP, which serves the user plane and hosts the Packet Data Convergence Protocol (PDCP) protocol and one gNB-CU-control plane (CP), which serves the control plane and hosts the PDCP and RRC protocol. For completeness it should be said that a gNB-DU hosts the radio link control (RLC)/medium access control (MAC)/physical (PHY) protocols.

In mobile networks, the load of a radio network node is constantly measured so that when it gets above a pre-configure threshold, procedures can be triggered so that part of this load is transferred to either a neighbor cell of the same radio access technology (RAT) or another RAT or frequency.

The set of procedures to support this transfer is called mobility load balancing (MLB). Currently, 3GPP specifies the following components for the MLB solution:
Load reporting
Load balancing action based on handovers (HO)
Adapting HO/cell reselection (CR) configuration so that the load remains balanced.

For LTE, the load reporting function is executed by exchanging cell specific load information between neighbour enhanced NodeBs (eNBs) over the X2 or S1 interfaces, e.g. wherein X2 is for an intra-LTE scenario and wherein S1 is for an inter-RAT scenario. In the case of intra-LTE load balance, the source eNB may trigger a RESOURCE_STATUS_REQUEST message to potential target eNBs at any point in time, for example when the load is above a pre-defined value i.e. Lte_load_threshold, as shown in FIG. 1b, which is an overloaded scenario triggering MLB procedures. Upon successful configuration of resource status reports from target to source, the target eNB can respond, periodically or not, with a RESOURCE_STATUS_UPDATE containing information about its load per cell. The message exchange is highlighted in FIG. 1c showing X2 Load exchange procedures for MLB.

A mobility load balancing algorithm running at a radio access node, for example, an eNB, has to decide which UE's will be handed over, a process called UE selection, and to which neighbor cells, a process called cell selection. These decisions are typically taken based mainly on the load reports and potentially available radio measurements of source cell and neighbor cells reported by the UE candidates. More details about UE/cell selection processes are given later.

In other words, the UE may send measurement reports, reference signal received power (RSRP), reference signal received quality (RSRQ), signal to interference plus noise ratio (SINR), etc., for a given neighbour cell, e.g., cell-2 in eNB-2, and, upon the reception of these and having load information of such neighbor cell the source may decide to handover the UE to the neighbor cell due to overload or not. In this case a handover preparation is triggered towards a target node, e.g., eNB-2.

As part of Resource Status Reporting procedure, a first eNB sending load information to a second eNB can include an indication, such as Cell Reporting Indicator, to indicate to the second eNB node that the ongoing transfer of load information has to be stopped. This may be used, e.g., as an indication that the load in the first eNB has become excessive.

Another procedure that may be executed is a Mobility Setting Change. The Mobility Setting Change procedure can be run before or after an MLB handover is performed. This procedure is aimed at negotiating between source cell and potential target cell a change on the *Handover Trigger event, which is used to trigger the mobility event from one cell to another. As an example, we can consider the case where the Mobility Setting Change is performed after the HO. Once the source eNB has selected the target eNB and which UE's will be offloaded, it performs a Mobility Setting Change Procedure, e.g. also specified by 3GPP [TS 36.423]. During this procedure, new mobility settings are negotiated between the source and target eNBs so that UE's handed over due to load balance will not be immediately handed over back. The procedure can either be followed or preceded by ordinary handovers, depending on the vendor implementation. A summary is shown in FIG. 1d.

Mobility Load Balancing (MLB) may be performed in NG RAN in one or more radio network nodes. MLB in NR follows signaling principles that are in line with LTE. Similar signaling mechanisms are used in NG-RAN with the difference that the MLB metrics are reported over the split RAN interfaces. To this end, signaling support for Resource Status Reporting has been introduced over Xn, F1 and E1, inter-node interfaces as well as enhanced over X2 for EN-DC scenario. In addition, the NG-RAN MLB functionality for has been enhanced by means of new types of load metrics and with finer load granularity compared to LTE, where load information is expressed on a per-cell basis only. In particular, the NG-RAN MLB enhancements may include:
Load information on a per synchronization signal block (SSB) coverage area granularity, such as
Radio Resource Status reporting per SSB area
Composite Available Capacity reporting per SSB Area
Load information on a per network slice granularity, such as
Slice Available Capacity reporting per slice
Hardware load indicator over E1
Transport network layer (TNL) capacity indication
Number of active UEs
Number of radio resource control (RRC) connections.

As an example, one can consider the Xn interface specification in TS 38.423 v16.2.0, where Resource Status Reporting Indication procedure is specified in sections 8.4.10, 8.4.11 and 9.1.3.

For scenarios relating to EN-DC, or for any multi connectivity scenarios, it has been proposed, e.g. in RAN3 #110-e, 3GPP contribution R3-206511, to introduce in the RESOURCE STATUS UPDATE an indication to reflect the potential resource aggregation that can be exploited for a certain cell. E.g., for each cell included in the RESOURCE STATUS UPDATE, it is proposed to add a list of cells that may be used to boost the performance via resource aggregation, e.g., Carrier Aggregation (CA) or Dual Connectivity (DC).

Such list of cells is produced on the basis of historical data collected at the sending node. For example, if the sending node records that the majority of its UEs served by Cell1 is able to be configured with DC with a secondary cell group (SCG) in Cell2, then the node will include Cell2 as a cell for possible DC configuration in the Cell Measurement Result Item IE in the X2: Resource Status Update.

The receiving node can then assess an overall capacity, taking resource aggregation into account, that might be used if a certain cell is selected as target for MLB.

SUMMARY

It has herein been identified that in the current solution, load reporting for a certain cell is lacking indication to reflect the performance that may be achieved when such cell is used together with other resources. In the R3-206511 contribution, the proposed approach may still lead to a significant increase in a signaling load when the request for load update indicates a periodic reporting.

An object of embodiments herein is to provide a mechanism that improves the performance in the wireless communication network.

According to an aspect the object is achieved by providing a method performed by a first radio network node for handling communication in a wireless communication network. The first radio network node transmits to a second radio network node a request for retrieval of an update indication of measurement or measurements upon a possible or potential resource aggregation of one or more cells controlled by the second radio network node. The request may indicate by an indication when to transmit the update indication.

According to another aspect the object is achieved by providing a method performed by a second radio network node for handling communication in a wireless communication network. The second radio network node receives from a first radio network node a request for retrieval of an update indication of measurement or measurements upon a possible or potential resource aggregation of one or more cells controlled by the second radio network node. The request may indicate, by an indication, when to transmit the update indication.

According to still another aspect the object is achieved by providing a first and a second radio network node configured to perform the methods herein.

Thus, it is herein provided a first radio network node for handling communication in a wireless communication network. The first radio network node is configured to transmit to a second radio network node, a request for retrieval of an update indication of measurement upon a potential resource aggregation of one or more cells controlled by the second radio network node.

It is herein also disclosed a second radio network node for handling communication in a wireless communication network. The second radio network is configured to receive from a first radio network node a request for retrieval of an update indication of measurement upon a potential resource aggregation of one or more cells controlled by the second radio network node.

It is furthermore provided herein a computer program product comprising instructions, which, when executed on at least one processor, cause the at least one processor to carry out any of the methods above, as performed by the first radio network node, or the second radio network node, respectively. It is additionally provided herein a computer-readable storage medium, having stored thereon a computer program product comprising instructions which, when executed on at least one processor, cause the at least one processor to carry out the method according to any of the methods above, as performed by the first radio network node, or the second radio network node, respectively.

It is herein introduced methods for load reporting of potential resource aggregation that may be exploited for at least one cell of, e.g., a neighbor RAN node.

Methods are introduced in the first radio network node to request the second radio network node to provide the first radio network node with one or more updates of one or more measurements of potential resource aggregation related to at least one cell controlled by the second radio network node.

The criteria used to send such update indications may be negotiated between the radio network nodes:

In one variant, the negotiation is done prior to a Resource Status Update taking place, e.g., via XnAP Resource Status Reporting Initiation procedure;
  the first radio network node may indicate a list of preferred criteria that the second radio network node may choose from to provide update indications on measurements of the potential resource aggregation of resources concerning cells controlled by the second radio network node, e.g., when a given threshold is passed, or a variation of the potential resource aggregation passes another threshold.
  the first radio network node may indicate a list of preferred reporting periodicities that the second radio network node may choose from to provide update indications on measurements of the potential resource aggregation of resources concerning cells controlled by the second radio network node, e.g., only one time, once every second, etc.
  the second radio network node may indicate to the first radio network node a preferred reporting periodicity or a preferred criterion or criteria for update indications on measurements of the potential resource aggregation of resources concerning cells controlled by the second radio network node.

The above update indications for reporting on measurements of the potential resource aggregation of resources concerning cells controlled by the second radio network node may comprise reporting an available capacity when resource aggregation is performed between a number of indicated cells, or an overall physical resource block (PRB) utilization when resource aggregation is performed between a number of indicated cells.

The update indication on measurement(s) of the potential resource aggregation of resources concerning cells controlled by the second radio network node may be performed on a per slice basis, or on a per beam area basis, e.g., SSB area.

The update indications for reporting on measurements of the potential resource aggregation of resources concerning cells controlled by the second radio network node may comprise reporting a total number of active UEs and/or a total number of RRC connections per overall group of cells involved in the resource aggregation configuration.

The criteria may be established at a configuration update, e.g., via XnAP NG-RAN Node Configuration Update procedure.

The criteria may be established at a configuration setup, e.g., via XnAP Xn Setup procedure.

The criteria to send such updates, e.g. which criteria triggers the sending of the updates, may be common for all radio network nodes.

The herein proposed solution enables the first radio network node to become aware of potential resource aggregation capabilities offered by the second radio network node in terms of multi-connectivity, such as Carrier Aggregation, and dual connectivity such as multi RAT dual connectivity (MR-DC), e.g., EN-DC or NR-DC. By doing this, the MLB actions triggered at the first radio network node may be optimized, to select the cells that offer better performance to the end user. By negotiating the periodicity of sending the update indication(s) it is possible to limit the impact in terms of signaling load between the first radio network node and the second radio network node. Thus, it is herein disclosed a solution that allow an efficient multi connectivity using load balancing, resulting in an improved performance of the wireless communication network.

BRIEF DESCRIPTION OF THE DRAWINGS

Embodiments will now be described in more detail in relation to the enclosed drawings, in which:

FIG. 1a illustrates an overall architecture of 5G-RAN;

FIG. 1b illustrates a process when MLB measures initiates;

FIG. 1c illustrates a process when MLB measures initiates;

FIG. 1d illustrates a Mobility Setting Change Procedure;

FIG. 3 is a combined signalling scheme and flowchart according to embodiments herein;

FIG. 5b is a block diagram depicting second radio network nodes according to embodiments herein;

DETAILED DESCRIPTION

Embodiments herein are described within the context of 3GPP NR radio technology (3GPP TS 38.300 V15.2.0 (2018 June)). It is understood, that the problems and solutions described herein are equally applicable to wireless access networks and user-equipments (UEs) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-stand-alone NR.

Figure 2:
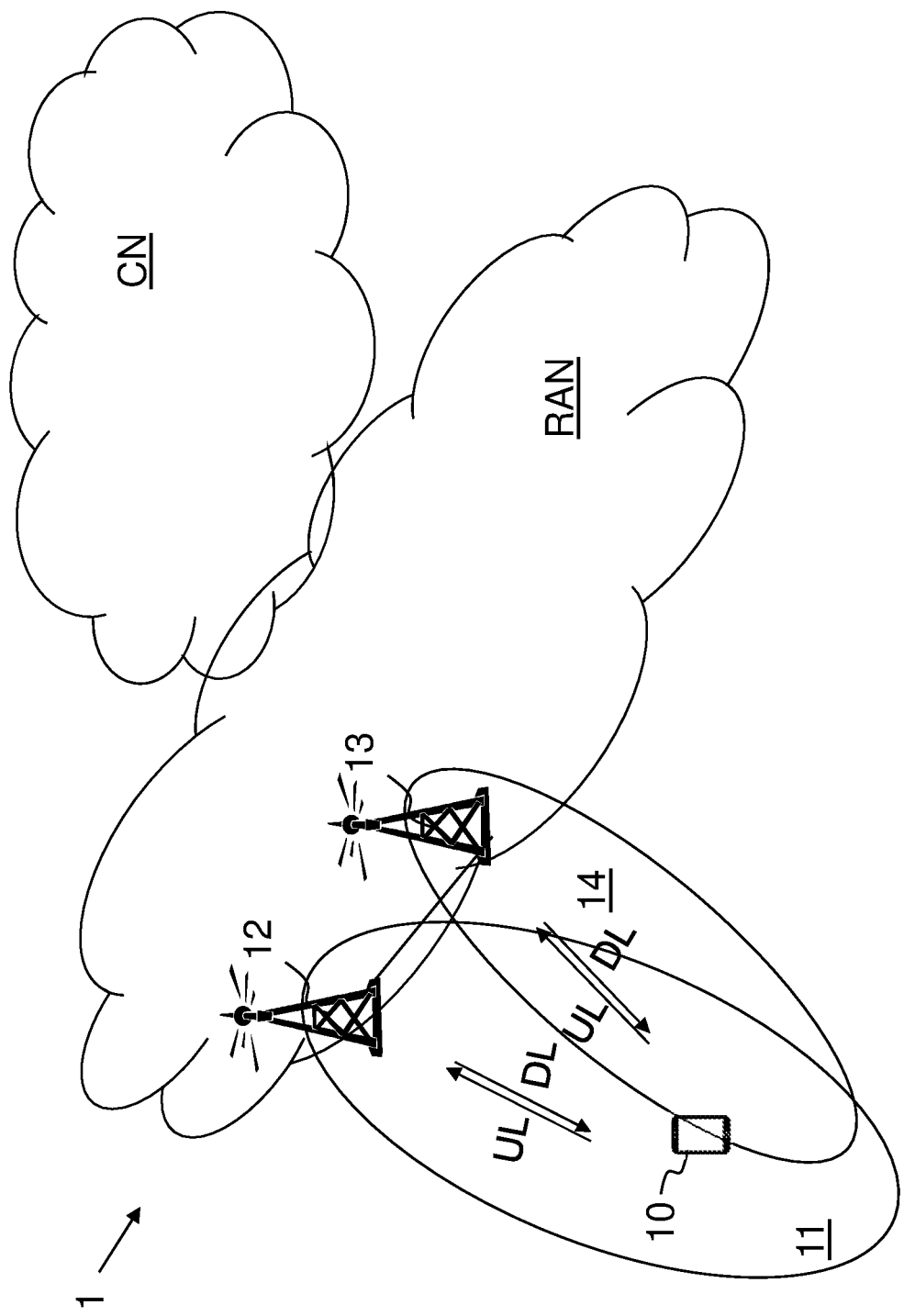
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UM B), just to mention a few possible implementations. Embodiments herein relate to recent technology trends that are of particular interest in a 5G context, however, embodiments are also applicable in further development of the existing wireless communication systems such as, e.g., WCDMA and LTE.

In the wireless communication network 1, wireless devices, e.g., a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, i.e., a first cell, of a radio access technology (RAT), such as LTE, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the first radio network node 12 depending e.g. on the radio access technology and terminology used. The first radio network node 12 may alternatively or additionally be a controller node or a packet processing node such as a radio controller node or similar. The first radio network node 12 may be referred to as the radio network node or as a serving network node. The first radio network node 12 may provide the first cell which may be referred to as a serving cell or primary cell. The first radio network node 12 communicates with the UE 10, e.g. using the first cell, in form of DL transmissions to the UE 10 and UL transmissions from the UE 10.

The wireless communication network 1 comprises a second radio network node 13 providing radio coverage over a geographical area, a second service area 14, of a radio access technology (RAT), such as LTE, WiMAX or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the second radio network node 13 depending e.g. on the radio access technology and terminology used. The second radio network node 13 may alternatively or additionally be a controller node or a packet processing node such as a radio controller node or similar. The second radio network node 13 may be referred to as a secondary serving network node, or secondary network node, wherein the second service area may be referred to as a secondary serving cell or secondary cell, and the secondary serving network node communicates with the UE 10 in form of DL transmissions to the UE 10 and UL transmissions from the UE 10.

It should be noted that a service area may be denoted as cell, beam, beam group or similar to define an area of radio coverage.

According to embodiments herein methods for measurement (load) reporting of potential resource aggregation may be exploited for at least one cell of a neighbor RAN node.

Embodiments herein may relate to any one or more of the following:
- A radio network node such as a RAN node, which may be any of gNB, eNB, en-gNB, ng-eNB, gNB-CU, gNB-CU-CP, eNB-CU, eNB-CU-CP.
- A UE such as a terminal equipment, which supports any of E-UTRAN, NR, MR-DC, e.g., such as EN-DC, NE-DC, NR-DC.

The proposed solution enables the first radio network node 12 to receive updates on potential resource aggregation for at least one cell controlled by the second radio network node 13, and which cell may thus be exploited for MLB actions.

In the remainder of the description the term "availability of potential resources" is used to indicate measures by which the resources that may be utilized to serve a UE at the reporting RAN node, i.e., the second radio network node 13, by means of resource aggregation configuration may be derived. Such measures may represent resource utilization or resource availability.

Note that in a general scenario the term "radio network node" may be substituted with "transmission point". Distinction between the transmission points (TPs) may typically be based on cell specific reference signals or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" may be thought of as interchangeable.

A method is illustrated in FIG. 3.

FIG. 3 is a combined flowchart and signalling scheme according to embodiments herein. The actions may be performed in any suitable order.

Action 301. The first radio network node 12 transmits a request for retrieval of the update indication of measurement or measurements upon a possible resource aggregation of one or more cells controlled by the second radio network node 13. For example, the first radio network node 12 may transmit a Resource Status Request for measurements of available resources in case of potential aggregation of resources for cell(s) in the second radio network node 13. The request may comprise a list of possible criteria such as periodicity, thresholds and similar.

Action 302. The second radio network node 13 may transmit (optionally) a Resource Status Response. For example, a response to acknowledge request, wherein a selection of a selected (preferred) criterion or criteria such as threshold or periodicity, may be indicated.

Action 303. The second radio network node 13 may transmit the update indication, e.g., in a Resource Status Update. The update indication indicates measurement(s) of available resources in case of potential aggregation of resources for cell(s) in the second radio network node 13.

Figure 4A:
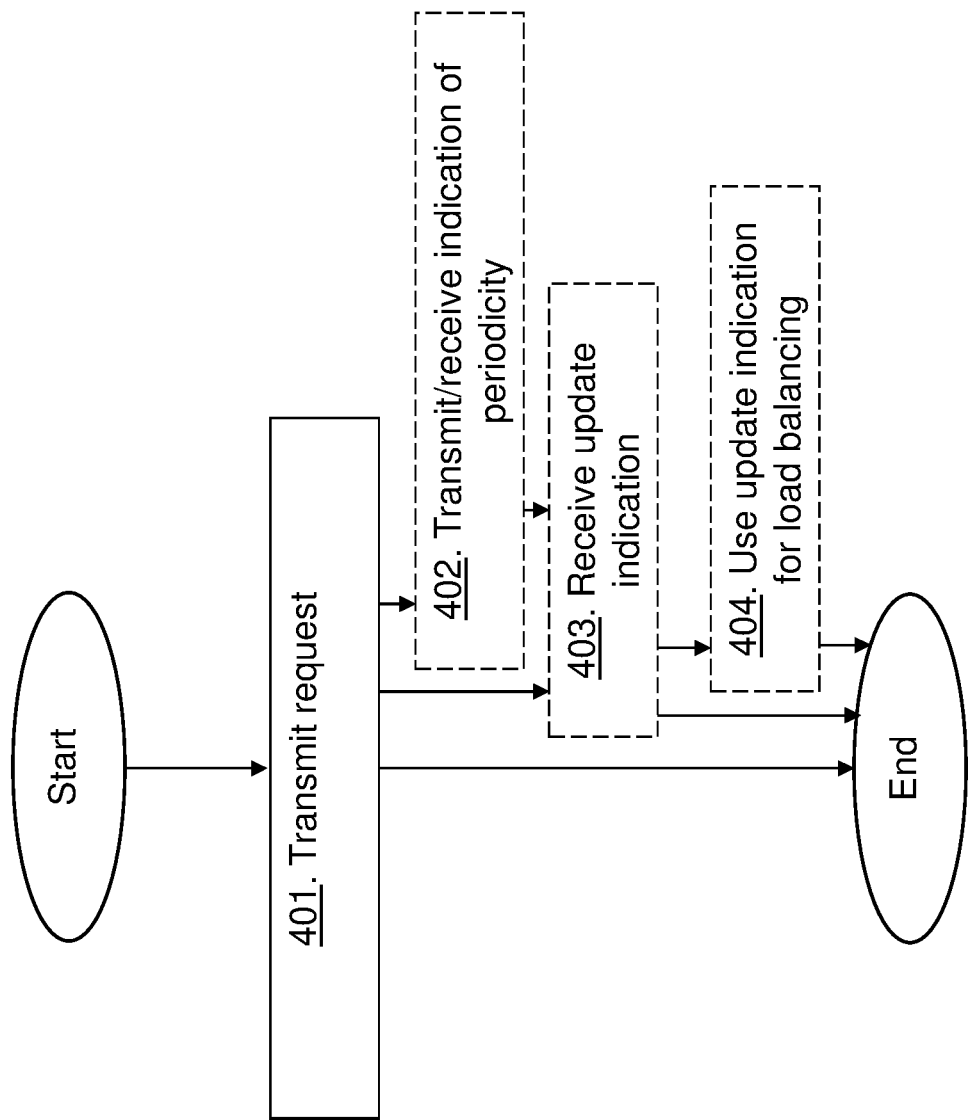
FIG. 4a is a flowchart depicting a method performed by a first radio network node according to embodiments herein.

The method actions performed by the first radio network node 12 for handling communication in the wireless communication network according to embodiments herein will now be described with reference to a flowchart depicted in FIG. 4a. The actions do not have to be taken in the order stated below, but may be taken in any suitable order. Actions performed in some embodiments are marked with dashed boxes.

Action 401. The first radio network node 12 transmits to the second radio network node 13 the request for retrieval of the update indication of measurement or measurements upon a possible or potential resource aggregation of one or more cells controlled by the second radio network node 13. The update indication may concern measurements of available resources for cases when the potential resource aggregation of one or more cells controlled by the second radio network node 13 occurs for a UE. The request may indicate, by an indication, when to transmit the update indication. The indication may, for example, comprise a list of criteria such as thresholds and periodicities. The indication may indicate that the second radio network node 13 should send the update indication according to one or more of the following:
- When or if an availability of the potential resource aggregation of resources concerning one or more cells controlled by the second radio network node 13 has passed a first threshold;
- When or if the availability of the potential resource aggregation of resources concerning one or more cells controlled by the second radio network node 13 is between a first and a second thresholds;
- When or if a variation of the availability of the potential resource aggregation of resources concerning one or more cells controlled by the second radio network node 13 has passed a first threshold or is between a first and a second threshold;
- When or if the variation of the availability of the potential resource aggregation of resources concerning one or more cells controlled by the second radio network node 13 is between a first and a second threshold;
- When or if the variation of the availability of the potential resource aggregation of resources concerning one or more cells controlled by the second radio network node is within any pre-configured thresholds defining ranges of available resources;
- When or if a type of supported aggregation level has changed;
- When or if a type of supported multi-connectivity has changed;
- according to a reporting periodicity that is agreed between the first radio network node 12 and the second radio network node 13.

The first radio network node 12 may send the indication from first to the second radio network node 13 via a configuration update request, e.g., XnAP NG-RAN Node Configuration Update, instead of Resource Status Request, and receive a response in a Configuration update Acknowledge, e.g., XnAP NG-RAN Node Configuration Update Acknowledge.

Alternatively, or additionally, the first radio network node may send the indication from first to the second radio network node via a setup request, e.g., XnAP Setup Request, instead of Resource Status Request, and receive a response from the second radio network node in a setup response message, e.g., XnAP Setup Response.

Alternatively, or additionally, at least one criterion for requesting, at the first radio network node 12, respectively sending, at the second radio network node 13, potential resource aggregation of resources concerning cells controlled by the second RAN node is preconfigured.

Action 402. Alternatively, or additionally, the first radio network node 12 may send to the second radio network node 13 at least one reporting periodicity to be used by the second radio network node 13 to send periodic updates on availability of potential resource aggregation of resources concerning one or more cells controlled by the second radio network node 13. Alternatively, or additionally, the first radio network node 12 may receive from the second radio network node 13, a response indicating a reporting periodicity selected by the second radio network node 13. Thus, the first radio network node 12 may transmit and/or receive a reporting indication indicating reporting periodicity to be used by the second radio network node 13 to send periodic updates on the availability of possible resource aggregation of a cell controlled by the second radio network node 13.

Action 403. The first radio network node 12 may receive from the second radio network node 13, the update indication indicating resource updates concerning one of the following:
  for each cell for which a Resource Status is received, a list of cells controlled by the second radio network node 13 that can be used for carrier aggregation or in multi-connectivity for a UE handed over to that cell;
  for each cell for which the Resource Status is received, an index representing the availability of potential resources of the one or more cells when the overall set of resources is the one achievable via carrier aggregation or multi-connectivity among a group of cells for a UE handed over to that cell;
  for each cell for which the Resource Status is received, a list of cells and respective indexes representing the availability of potential resources of the one or more cells when the overall set of resources is the one achievable via carrier aggregation or multi-connectivity among a group of cells for a UE handed over to that cell;
  for each cell for which the Resource Status is received, an indication of the cells that can be used for Carrier Aggregation and or multi-connectivity in a downlink, DL, direction, in an uplink, UL, direction or both in DL and UL;
  for each cell for which the Resource Status is received, an indication of a supported multi-connectivity type.

Thus, the first radio network node 12 may receive the update indication from the second radio network node 13 indicating data related to measurement or measurements upon a possible resource aggregation of a cell controlled by the second radio network node 13.

Action 404. The first radio network node 12 may then perform a load balancing process based on the received updated indication. For example, may handover or not a UE to the second radio network node 13.

In other words:
Embodiments at the first radio network node 12.
The first radio network node 12 may:
  send to the second radio network node 13 a request, e.g., a Resource Status Request, with an update indication indicating to the second radio network node 13 that the second radio network node 13 is requested to provide updates to the first radio network node 12, e.g., in Resource Status Update or the alike, concerning measurements of available resources for cases when the potential resource aggregation of cells controlled by the second radio network node 13 may occur for a given UE.
The first radio network node 12 may further send the indication relating to when to provide such an update. The indication may indicate that the second radio network node 13 should send updates to the first radio network node 12:
  if the potential availability of resource aggregation of resources concerning cells controlled by the second radio network node 13 has passed a first threshold,
  if the potential availability of resource aggregation of resources concerning cells controlled by the second radio network node 13 is between a first and a second thresholds,
  if the variation of the availability of potential resource aggregation of resources concerning cells controlled by the second radio network node 13 has passed a first threshold or is between a first and a second threshold,
  if the variation of the availability of potential resource aggregation of resources concerning cells controlled by the second radio network node 13 is between a first and a second threshold,
  if the variation of the availability of potential resource aggregation of resources concerning cells controlled by the second radio network node 13 is within any pre-configured thresholds defining ranges of available resources, e.g., 5 thresholds may be defined, dividing the available resource space into 4 ranges and the reporting node, e.g. the first radio network node 12, indicates if a change of available resources implies that the available resources moved to within any of the pre-defined ranges,
  if the type of supported aggregation level has changed, e.g. the number of potential carriers that can be used for Carrier Aggregation in DL or UL or in both directions have increased or decreased,
  if the type of supported multi-connectivity, e.g. EN-DC, NR-DC has changed,
  (optionally) according to a reporting periodicity that may be agreed between the first radio network node 12 and the second radio network node 13.
  (optionally) send to the second radio network node 13 at least one reporting periodicity to be used by the second radio network node 13 to send periodic updates on the availability of potential resource aggregation of resources concerning cells controlled by the second radio network node 13,
  A list of reporting periodicity may be used, from which the second radio network node 13 may select from,
  (optionally) receive, from the second radio network node 13, a response indicating the reporting periodicity selected by the second radio network node 13,
  receive, from the second radio network node 13, resource updates concerning one of the following:
  for each cell for which the Resource Status is received, a list of cells controlled by the second radio network node 13 that may be used for carrier aggregation or in multi-connectivity for a UE handed over to that cell,
  for each cell for which the Resource Status is received, an index, e.g. from 0 to 100 or any suitable index, representing the availability of potential resources of the cell when the overall set of resources is the one achievable via carrier aggregation or multi-connectivity among a group of cells for a UE handed over to that cell,
  for each cell for which the Resource Status is received, a list of cells and respective indexes, e.g. from 0 to 100 or any suitable index, representing the availability of potential resources of the cell when the overall set of resources is the one achievable via carrier aggregation or multi-connectivity among a group of cells for a UE handed over to that cell, for each cell for which the Resource Status is received, an indication of the cells that may be used for Carrier Aggregation and or multi-connectivity, e.g. dual connectivity, in the DL direction, in the UL direction or both in DL and UL, for each cell for which the Resource Status is received, an indication of the supported multi-connectivity type, e.g. EN-DC, NR-DC;

The first radio network node 12 may receive based on event, e.g., upon entering a condition, or upon leaving a condition The first radio network node 12 may receive periodically, e.g., using the same value or a multiple value of the reporting periodicity used for the Resource Status Update The indication may be sent from first radio network node 12 to the second radio network node 13 via a configuration update request, e.g., XnAP NG-RAN Node Configuration Update, instead of Resource Status Request, and receiving a response in a Configuration update Acknowledge, e.g., XnAP NG-RAN Node Configuration Update Acknowledge The update indication may be sent from first to the second RAN node via a setup request, e.g., XnAP Setup Request, instead of Resource Status Request, and receiving a response from the second RAN node in a setup response message, e.g., XnAP Setup Response.

The at least one criterion for requesting, at the first radio network node 12, and respectively sending, at the second radio network node 13, potential resource aggregation of resources concerning cells controlled by the second radio network node 13 may be preconfigured.

Figure 4B:
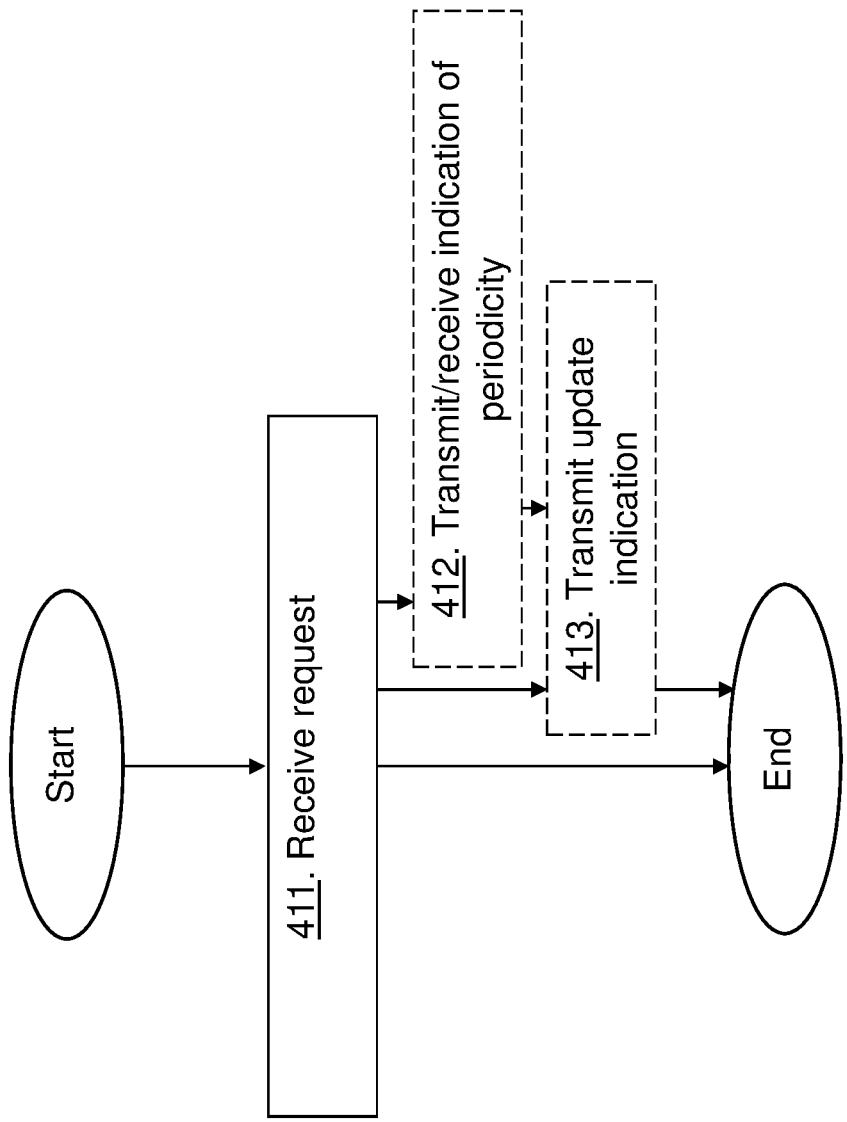
FIG. 4b is a flowchart depicting a method performed by a second radio network node according to embodiments herein.

The method actions performed by the second radio network node 13 for handling communication in the wireless communication network according to embodiments herein will now be described with reference to a flowchart depicted in FIG. 4b. The actions do not have to be taken in the order stated below, but may be taken in any suitable order. Actions performed in some embodiments are marked with dashed boxes.

Action 411. The second radio network node 13 receives from the first radio network node 12 the request for retrieval of the update indication of measurement or measurements upon the potential resource aggregation of the one or more cells controlled by the second radio network node 13. The request may indicate, by the indication, when to transmit the update indication.

Action 412. The second radio network node 13 may receive from the first radio network node 12 the at least one reporting periodicity to be used by the second radio network node 13 to send periodic updates on availability of potential resource aggregation of resources concerning the one or more cells controlled by the second radio network node 13. The second radio network node may, alternatively or additionally, transmit to the first radio network node 12, the response indicating the reporting periodicity selected by the second radio network node 13. Thus, the second radio network node 13 may transmit and/or receive a reporting indication indicating reporting periodicity to be used by the second radio network node 13 to send periodic updates on the availability of possible resource aggregation of a cell controlled by the second radio network node 13.

Action 413. The second radio network node 13 may transmit the update indication to the first radio network node 12 indicating data related to measurement or measurements upon a possible or potential resource aggregation of the one or more cells controlled by the second radio network node 13.

In other words, the second radio network node 13 may:

receive from the first radio network node 12 the request, e.g., in a Resource Status Request, with the update indication indicating to the second RAN node that the second RAN node is requested to provide updates to the first RAN node, e.g., in Resource Status Update or the like, concerning the availability of potential resources available when resource aggregation of cells controlled by the second radio network node 13 is applied to a UE handing over to the second radio network node 13.

The first radio network node 12 may send the indication indicating that the second radio network node 13 should send updates to the first radio network node as specified in the embodiments for the first radio network node 12.

(optionally) receive from the first radio network node 12 the at least one reporting periodicity to be used by the second radio network node 13 to send periodic updates on the availability of potential resource available when aggregation of resources concerning cells controlled by the second radio network node 13 is applied to a UE handing over to the second radio network node 13.

(optionally) select one of the reporting periodicities received from the first radio network node 12.

(optionally) send to the first radio network node 12, a response indicating the reporting periodicity selected by the second radio network node 13 send to the first radio network node 12 resource updates as specified in the embodiments for the first radio network node 12.

receive from the first radio network node 12 a configuration update request, e.g., XnAP NG-RAN Node Configuration Update, instead of Resource Status Request, and send a response to the first radio network node 12 in a Configuration update Acknowledge, e.g., XnAP NG-RAN Node Configuration Update Acknowledge.

receive from the first radio network node 12 a setup request, e.g., XnAP Setup Request, instead of Resource Status Request, and send to the first radio network node 12 a response in a setup response message, e.g., XnAP Setup Response.

Example of Implementation

An example of possible implementation for XnAP (TS 38.423) is provided in the text below. The part highlighted in bold text and underlined pertains to embodiments herein.

9.1.3.18 Resource Status Request

This message is sent by NG-RAN node, to NG-RAN node 2 to initiate the requested measurement according to the parameters given in the message. The message may comprise the indication according to embodiments herein e.g. as exemplified below. Direction: NG-RAN node$_1$→NG-RAN node$_2$.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1 . . . 4095, . . .) | Allocated by NG-RAN node$_1$ | YES | reject |
| NG-RAN node2 Measurement ID | C-ifRegistrationRequestStoporAdd | | INTEGER (1 . . . 4095, . . .) | Allocated by NG-RAN node$_2$ | YES | ignore |
| Registration Request | M | | ENUMERATED(start, stop, add, . . .) | Type of request for which the resource status is required. | YES | reject |
| Report Characteristics | C-ifRegistrationRequestStart | | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Other bits shall be ignored by the NG-RAN node2. | YES | reject |
| Cell To Report List | | 0 . . . 1 | | Cell ID list to which the request applies. | YES | ignore |
| >Cell To Report Item | | 1 . . . <maxnoofCellsinNG-RANnode> | | | — | |
| >>Cell ID | M | | Global NG-RAN Cell Identity 9.2.2.27 | | — | |
| >>SSB To Report List | | 0 . . . 1 | | SSB list to which the request applies. | — | |
| >>>SSB To Report Item | | 1 . . . <maxnoofSSBAreas> | | | — | |
| >>>>SSB-Index | M | | INTEGER (0 . . . , 63 . . .) | | — | |
| >>Slice To Report List | | 0 . . . 1 | | S-NSSAI list to which the request applies. | — | |
| >>>Slice To Report Item | | 1 . . . <maxnoofBPLMNs> | | | — | |
| >>>>PLMN Identity | M | | 9.3.1.14 | Broadcast PLMN | — | |
| >>>>S-NSSAI List | | 1 | | | — | |
| >>>>>S-NSSAI Item | | 1 . . . <maxnoofSliceItems> | | | — | |
| >>>>>>S-NSSAI | M | | S-NSSAI 9.3.1.38 | | — | |
| >>Aggregation level reporting event | O | | ENUMERATED (on-enter, on-leave, . . .) | | — | |
| >>Aggregation level reporting Request Indication | O | | ENUMERATED (above threshold, below threshold, between thresholds, . . .) | | — | |
| >>Aggregation level reporting threshold1 | O | | INTEGER (0 . . . 100) | | — | |
| >>Aggregation level reporting threshold2 | O | | INTEGER (0 . . . 100) | | — | |
| Reporting Periodicity | O | | ENUMERATED(500 ms, 1000 ms, 2000 ms, 5000 ms, 10000 ms, . . .) | Periodicity that may be used for reporting of PRB Periodic, TNL Capacity Ind Periodic, Composite Available Capacity Periodic. Also used | YES | Ignore |

| | |
|---|---|
| | as the averaging window length for all measurement object if supported. |

| Condition | Explanation |
|---|---|
| ifRegistrationRequestStoporAdd | This IE shall be present if the Registration Request IE is set to the value "stop" or "add". |
| ifRegistrationRequestStart | This IE shall be present if the Registration Request IE is set to the value "start". |

| Range bound | Explanation |
|---|---|
| maxnoofCellsinNG-RANnode | Maximum no. cells that can be served by a NG-RAN node. Value is 16384. |
| maxnoofSSBAreas | Maximum no. SSB Areas that can be served by a NG-RAN node cell. Value is 64. |
| maxnoofSliceItems | Maximum no. of signalled slice support items. Value is 1024. |

9.1.3.21 Resource Status Update
This message is sent by NG-RAN node$_2$ to NG-RAN node$_1$ to report the results of the requested measurements.
Direction: NG-RAN node$_2$→NG-RAN node$_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 ... 4095, ...) | Allocated by NG-RAN node$_1$ | YES | reject |
| NG-RAN node2 Measurement ID | M | | INTEGER (1 ... 4095, ...) | Allocated by NG-RAN node$_2$ | YES | reject |
| Cell Measurement Result | | 1 | | | YES | ignore |
| >Cell Measurement Result Item | | 1 ... <maxnoofCellsinNG-RANnode> | | | YES | ignore |
| >>Cell ID | M | | Global NG-RAN Cell Identity 9.2.2.27 | | — | |
| >>Radio Resource Status | O | | 9.2.2.50 | | — | |
| >>TNL Capacity Indicator | O | | 9.2.2.49 | | — | |
| >>Composite Available Capacity Group | O | | 9.2.2.51 | | — | |
| >>Slice Available Capacity | O | | 9.2.2.55 | | — | |
| >>Number of Active UEs | O | | 9.2.2.62 | | — | |
| >>RRC Connections | O | | 9.2.2.56 | | — | |
| >>Aggregation Cell list | O | | | | YES | ignore |
| >>Aggregation Cell item | | 1 ... 32 | | This IE indicates a list of cells with which resource aggregation may be configured | — | |
| >>>>Aggregation Cell ID | | | 9.2.x | | — | |
| >>>>Aggregation Index | | | INTEGER (0 ... 100, ...) | | — | |

9.2-x Aggregation Cell ID (Update Indication)
This IE contains either an NR CGI or an E-UTRA CGI.

| IE/Group Name | Presence | Range | IE type and reference | Semantics description |
|---|---|---|---|---|
| CHOICE Target Cell | M | | | |
| >NR | | | | |
| >>NR CGI | M | | 9.2.111 | |
| >E-UTRA | | | | |
| >>E-UTRA CGI | M | | 9.2.14 | |

Figure 5A:
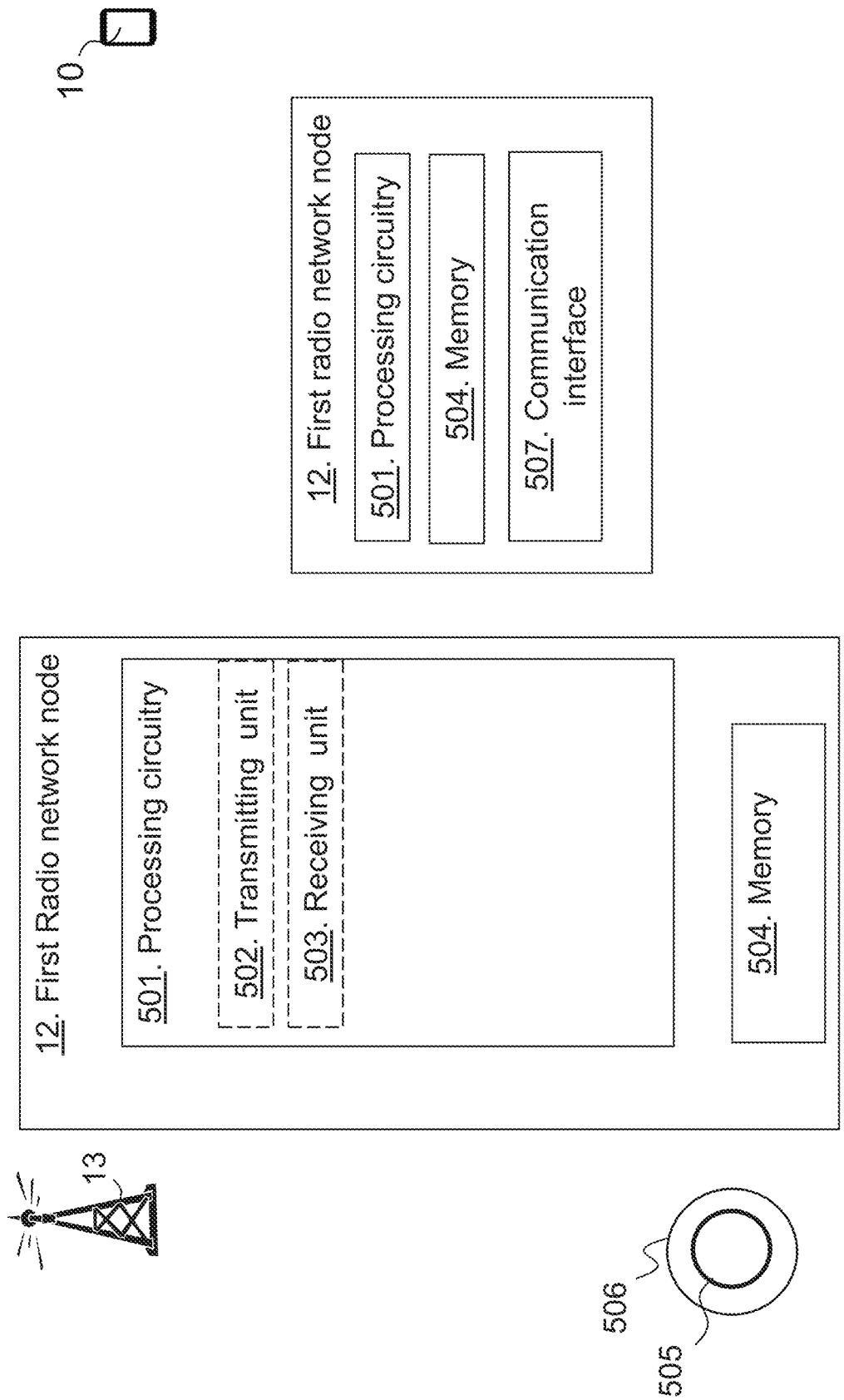
FIG. 5a is a block diagram depicting first radio network nodes according to embodiments herein.

FIG. 5a is a block diagram depicting the first radio network node 12 for handling communication in the wireless communication network such as handling signalling in the wireless communication network 1 according to embodiments herein.

The first radio network node 12 may comprise processing circuitry 501, e.g., one or more processors, configured to perform the methods herein.

The first radio network node 12 may comprise a transmitting unit 502, e.g., a transmitter or a transceiver. The first radio network node 12, the processing circuitry 501, and/or the transmitting unit 502 is configured to transmit to the second radio network node 13 the request for retrieval of the update indication of measurement or measurements upon a possible or potential resource aggregation of the one or more cells controlled by the second radio network node 13. The update indication may concern measurements of available resources for cases when the potential resource aggregation of the one or more cells controlled by the second radio network node 13 occurs for the UE. The request may indicate, by the indication, when to transmit the update indication. The indication may indicate that the second radio network node 13 should send the update indication according to one or more of the following:
  when or if an availability of the potential resource aggregation of resources concerning one or more cells controlled by the second radio network node 13 has passed a first threshold;
  when or if the availability of the potential resource aggregation of resources concerning one or more cells controlled by the second radio network node 13 is between a first and a second thresholds;
  when or if a variation of the availability of the potential resource aggregation of resources concerning one or more cells controlled by the second radio network node 13 has passed a first threshold or is between a first and a second threshold;
  if the variation of the availability of the potential resource aggregation of resources concerning one or more cells controlled by the second radio network node is between a first and a second threshold;
  if the variation of the availability of the potential resource aggregation of resources concerning one or more cells controlled by the second radio network node is within any pre-configured thresholds defining ranges of available resources;
  if a type of supported aggregation level has changed;
  if a type of supported multi-connectivity has changed; and
  according to a reporting periodicity that is agreed between the first radio network node 12 and the second radio network node 13.

The first radio network node 12, the processing circuitry 501, and/or the transmitting unit 502 may be configured to send to the second radio network node 13, the at least one reporting periodicity to be used by the second radio network node 13 to send periodic updates on availability of potential resource aggregation of resources concerning the one or more cells controlled by the second radio network node 13. Thus, the first radio network node 12, the processing circuitry 501, and/or the transmitting unit 502 may be configured transmit the reporting indication indicating reporting periodicity to be used by the second radio network node 13 to send periodic updates on the availability of possible resource aggregation of a cell controlled by the second radio network node 13.

The first radio network node 12 may comprise a receiving unit 503, e.g., a receiver or a transceiver. The first radio network node 12, the processing circuitry 501, and/or the receiving unit 503 may be configured to receive from the second radio network node 13, the response indicating the reporting periodicity selected by the second radio network node 13. The first radio network node 12, the processing circuitry 501, and/or the receiving unit 503 may be configured to receive the update indication from the second radio network node 13 indicating data related to measurement or measurements upon a possible resource aggregation of a cell controlled by the second radio network node 13. The first radio network node 12, the processing circuitry 501, and/or the receiving unit 503 may be configured to receive the reporting indication indicating reporting periodicity to be used by the second radio network node 13 to send periodic updates on the availability of possible resource aggregation of a cell controlled by the second radio network node 13. The first radio network node 12, the processing circuitry 501, and/or the receiving unit 503 may be configured to receive from the second radio network node 13, the update indication indicating resource updates concerning one of the following:
  for each cell for which a Resource Status is received, a list of cells controlled by the second radio network node 13 that can be used for carrier aggregation or in multi-connectivity for a UE handed over to that cell;
  for each cell for which the Resource Status is received, an index representing the availability of potential resources of the one or more cells when the overall set of resources is the one achievable via carrier aggregation or multi-connectivity among a group of cells for a UE handed over to that cell;
  for each cell for which the Resource Status is received, a list of cells and respective indexes representing the availability of potential resources of the one or more cells when the overall set of resources is the one achievable via carrier aggregation or multi-connectivity among a group of cells for a UE handed over to that cell;
  for each cell for which the Resource Status is received, an indication of the cells that can be used for Carrier Aggregation and or multi-connectivity in a downlink, DL, direction, in an uplink, UL, direction or both in DL and UL;
  for each cell for which the Resource Status is received, an indication of a supported multi-connectivity type.

The first radio network node 12 further comprises a memory 504. The memory comprises one or more units to be used to store data on, such as indications, thresholds, RSs, strengths or qualities, UL grants, indications, requests, commands, timers, applications to perform the methods disclosed herein when being executed, and similar. Thus, embodiments herein may disclose a first radio network node 12 for handling communication in a wireless communication network, wherein the first radio network node 12 comprises processing circuitry and a memory, said memory comprising instructions executable by said processing circuitry whereby said first radio network node 12 is operative to perform any of the methods herein. The first radio network node 12 comprises a communication interface 507 comprising one or more antennas.

The methods according to the embodiments described herein for the first radio network node 12 are respectively implemented by means of, e.g., a computer program product 505 or a computer program, comprising instructions, i.e., software code portions, which, when executed on at least one processor, cause the at least one processor to carry out the actions described herein, as performed by the first radio network node 12. The computer program product 505 may be stored on a computer-readable storage medium 506, e.g., a universal serial bus (USB) stick, a disc or similar. The computer-readable storage medium 506, having stored thereon the computer program product, may comprise the instructions which, when executed on at least one processor, cause the at least one processor to carry out the actions described herein, as performed by the first radio network node 12. In some embodiments, the computer-readable storage medium may be a non-transitory or a transitory computer-readable storage medium.

FIG. 5b is a block diagram depicting the second radio network node 13 for handling communication in the wireless communication network 1, e.g., facilitating, configuration in the wireless communication network 1 according to embodiments herein.

The second radio network node 13 may comprise processing circuitry 511, e.g. one or more processors, configured to perform the methods herein.

The second radio network node 13 may comprise a receiving unit 512, e.g. a receiver or a transceiver. The second radio network node 13, the processing circuitry 511, and/or the receiving unit 512 is configured to receive from the first radio network node 12 the request for retrieval of the update indication of measurement or measurements upon the possible or potential resource aggregation of the one or more cells controlled by the second radio network node 13. The request may indicate, by the indication, when to transmit the update indication.

The second radio network node 13, the processing circuitry 511, and/or the receiving unit 512 may be configured to receive from the first radio network node 12 the at least one reporting periodicity to be used by the second radio network node 13 to send periodic updates on availability of potential resource aggregation of resources concerning one or more cells controlled by the second radio network node 13. Thus, the second radio network node 13, the processing circuitry 511, and/or the receiving unit 512 may be configured to receive the reporting indication indicating reporting periodicity to be used by the second RAN node to send periodic updates on the availability of possible resource aggregation of a cell controlled by the second radio network node 13.

The second radio network node 13 may comprise a transmitting unit 513. The second radio network node 13, the processing circuitry 511 and/or the transmitting unit 513 may be configured to transmit, to the first radio network node 12, the response indicating the reporting periodicity selected by the second radio network node 13. The second radio network node 13, the processing circuitry 511 and/or the transmitting unit 513 may be configured to transmit the update indication to the first radio network node 12 indicating data related to measurement or measurements upon a possible or potential resource aggregation of one or more cells controlled by the second radio network node 13. The second radio network node 13, the processing circuitry 511 and/or the transmitting unit 513 may be configured to transmit the reporting indication indicating reporting periodicity to be used by the second RAN node to send periodic updates on the availability of possible resource aggregation of a cell controlled by the second radio network node 13.

The second radio network node 13 further comprises a memory 514. The memory comprises one or more units to be used to store data on, such as thresholds, measurements, aggregation information, indications, strengths or qualities, grants, scheduling information, timers, applications to perform the methods disclosed herein when being executed, and similar. Thus, embodiments herein may disclose a second radio network node 13 for handling communication in a wireless communication network, wherein the second radio network node 13 comprises processing circuitry and a memory, said memory comprising instructions executable by said processing circuitry whereby said second radio network node 13 is operative to perform any of the methods herein. The second radio network node 13 comprises a communication interface 517 comprising transmitter, receiver, transceiver and/or one or more antennas.

The methods according to the embodiments described herein for second radio network node 13 are respectively implemented by means of, e.g., a computer program product 515 or a computer program product, comprising instructions, i.e., software code portions, which, when executed on at least one processor, cause the at least one processor to carry out the actions described herein, as performed by the second radio network node 13. The computer program product 515 may be stored on a computer-readable storage medium 516, e.g., a USB stick, a disc or similar. The computer-readable storage medium 516, having stored thereon the computer program product, may comprise the instructions which, when executed on at least one processor, cause the at least one processor to carry out the actions described herein, as performed by the second radio network node 13. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
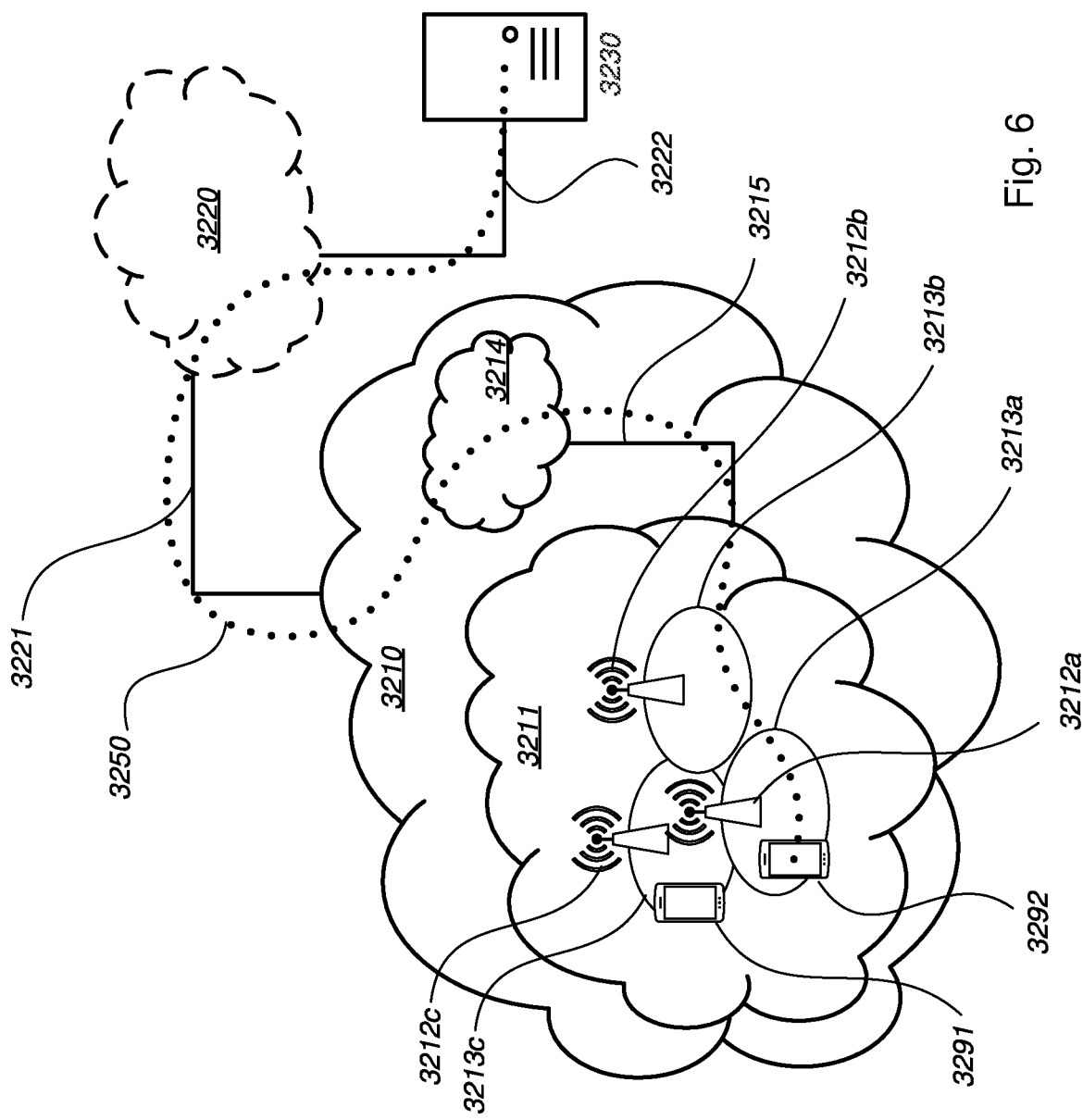
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as N Bs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
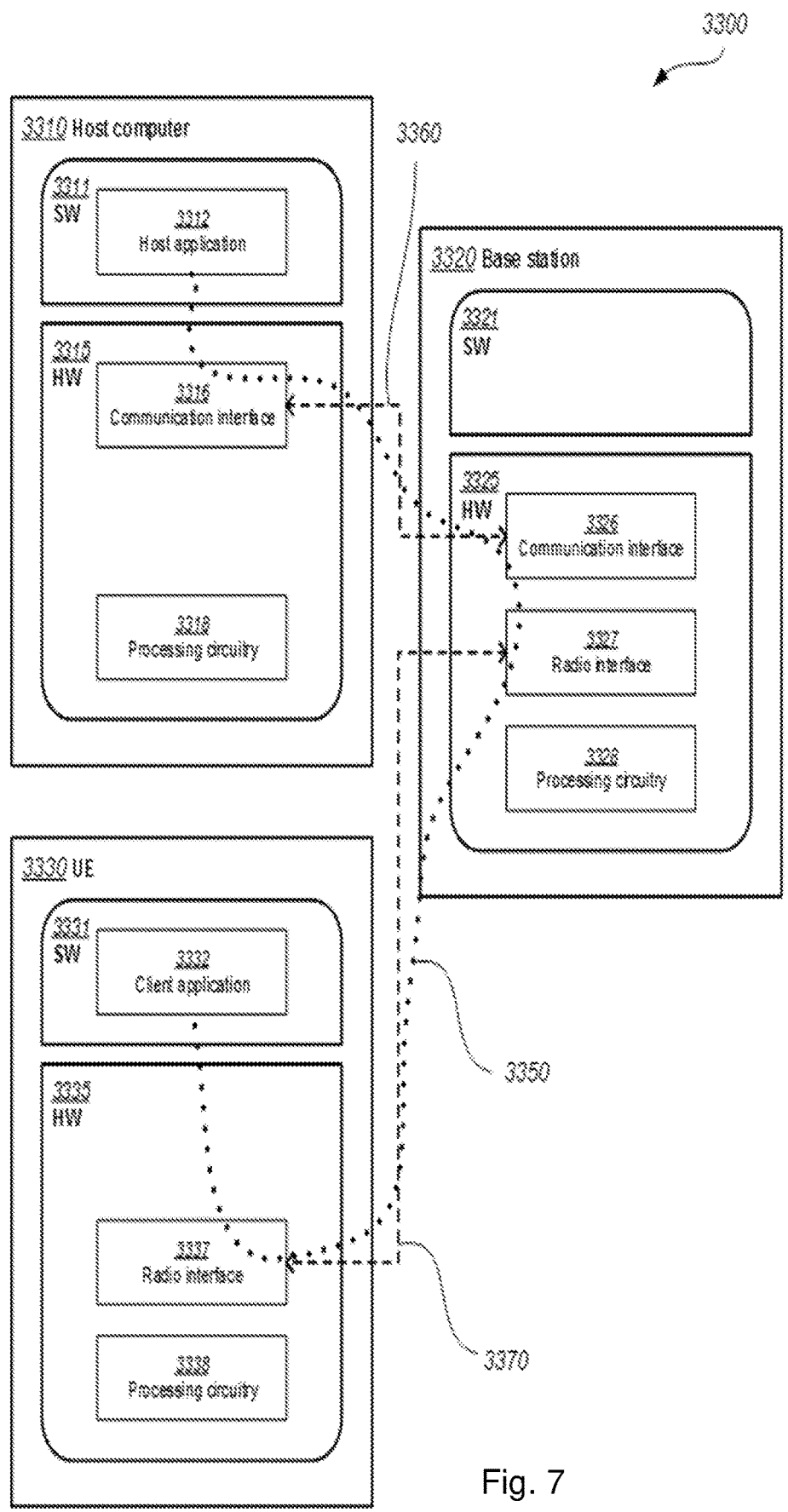
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since signalling is handled more efficiently and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 8:
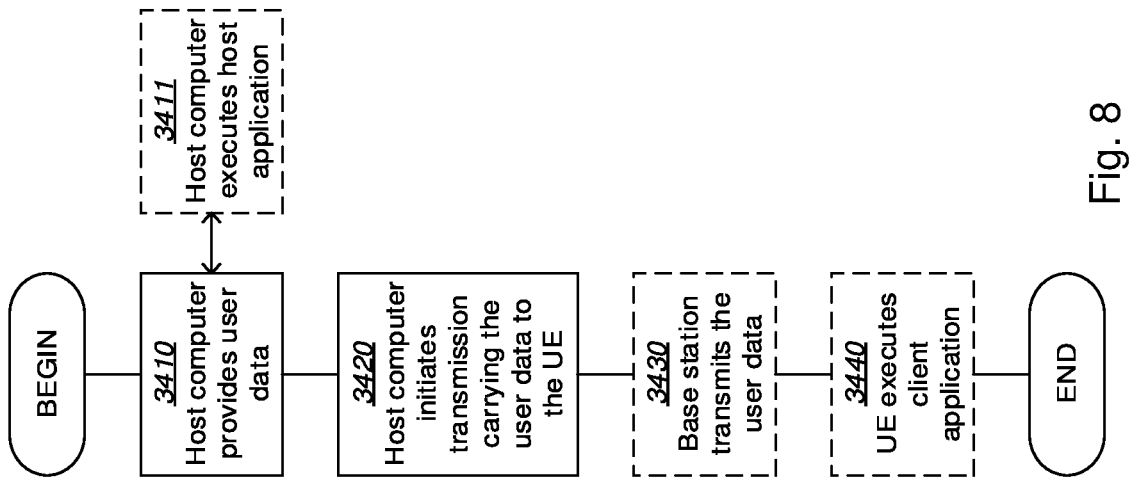

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 9:
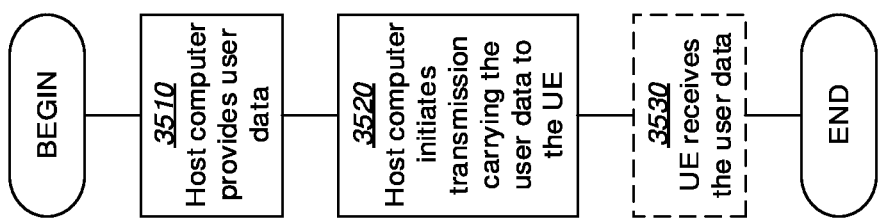
FIGS. 8-11 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 10:
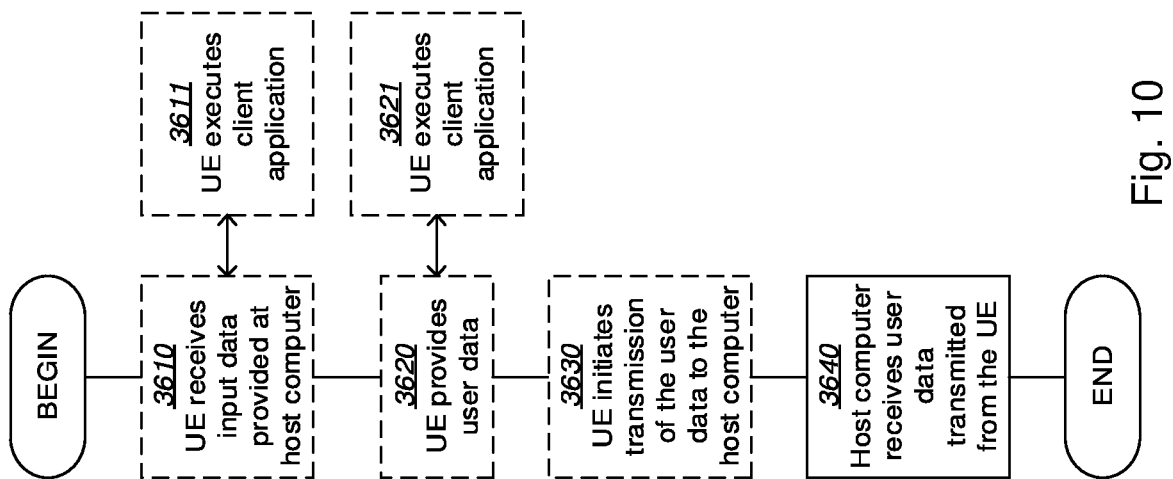

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 11:
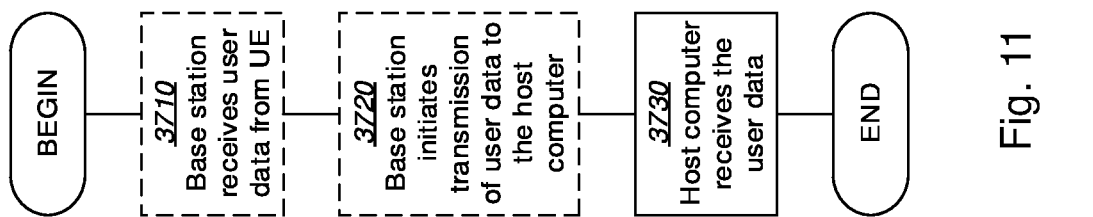

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter UARFCN UMTS Absolute Radio Frequency Channel Number
UE User equipment
UL Uplink

The invention claimed is:

1. A method performed by a first radio network node for handling communication in a wireless communication network, the method comprising:
    transmitting, to a second radio network node, a request for retrieval of an update indication of measurement upon a potential resource aggregation of one or more cells controlled by the second radio network node; and
    receiving the update indication from the second radio network node in response to the request, wherein the update indication includes resource status updates for at least one of the cells controlled by the second radio network node, wherein each resource status update for a cell is one of the following:
        a list of cells controlled by the second radio network node that can be used for carrier aggregation and/or multi-connectivity for a user equipment (UE) handed over to that cell;
        an index representing the availability of potential resources of the one or more cells when the overall set of resources is the one achievable via carrier aggregation and/or multi-connectivity among a group of cells for a UE handed over to that cell;
        a list of cells and respective indexes representing the availability of potential resources of the one or more cells when the overall set of resources is the one achievable via carrier aggregation and/or multi-connectivity among a group of cells for a UE handed over to that cell;
        an indication of the cells that can be used for carrier aggregation and/or multi-connectivity in a downlink (DL) direction, in an uplink (UL) direction, or in both DL and UL directions; or
        an indication of a multi-connectivity type supported for that cell.

2. The method according to claim 1, wherein the update indication concerns measurements of available resources for cases when the potential resource aggregation of one or more cells controlled by the second radio network node occurs for a UE.

3. The method according to claim 1, wherein the request includes an indication of when the second radio network node should send the update indication.

4. The method according to claim 3, wherein the indication indicates that the second radio network node should send the update indication according to one or more of the following:
    when an availability of the potential resource aggregation of resources concerning one or more cells controlled by the second radio network node has passed a first threshold;
    when the availability of the potential resource aggregation of resources concerning one or more cells controlled by the second radio network node is between a first and a second thresholds;
    when a variation of the availability of the potential resource aggregation of resources concerning one or more cells controlled by the second radio network node has passed a first threshold or is between a first and a second threshold;
    when the variation of the availability of the potential resource aggregation of resources concerning one or more cells controlled by the second radio network node is between a first and a second threshold;
    when the variation of the availability of the potential resource aggregation of resources concerning one or more cells controlled by the second radio network node is within any pre-configured thresholds defining ranges of available resources;
    when a type of supported aggregation level has changed;
    when a type of supported multi-connectivity has changed; and
    periodically at a reporting periodicity agreed between the first radio network node and the second radio network node.

5. The method according to claim 1, further comprising one or more of the following:
    sending, to the second radio network node, at least one reporting periodicity to be used by the second radio network node to send periodic updates on availability of potential resource aggregation of resources concerning one or more cells controlled by the second radio network node; and
    receiving, from the second radio network node, a reporting periodicity selected by the second radio network node.

6. A method performed by a second radio network node for handling communication in a wireless communication network, the method comprising:
    receiving from a first radio network node a request for retrieval of an update indication of measurement upon a potential resource aggregation of one or more cells controlled by the second radio network node,
    sending the update indication to the first radio network node in response to the request, wherein the update indication includes resource status updates for at least one of the cells controlled by the second radio network node, wherein each resource status update for a cell is one of the following:
        a list of cells controlled by the second radio network node that can be used for carrier aggregation and/or multi-connectivity for a user equipment (UE) handed over to that cell;
        an index representing the availability of potential resources of the one or more cells when the overall set of resources is the one achievable via carrier aggregation and/or multi-connectivity among a group of cells for a UE handed over to that cell;
        a list of cells and respective indexes representing the availability of potential resources of the one or more cells when the overall set of resources is the one achievable via carrier aggregation and/or multi-connectivity among a group of cells for a UE handed over to that cell;
        an indication of the cells that can be used for carrier aggregation and/or multi-connectivity in a downlink (DL) direction, in an uplink (UL) direction, or in both DL and UL directions; or
        an indication of a multi-connectivity type supported for that cell.

7. The method according to claim 6, wherein the request includes an indication of when the second radio network node should send the update indication.

8. The method according to claim 7, wherein the indication indicates that the second radio network node should send the update indication according to one or more of the following:

when an availability of the potential resource aggregation of resources concerning one or more cells controlled by the second radio network node has passed a first threshold;
when the availability of the potential resource aggregation of resources concerning one or more cells controlled by the second radio network node is between a first and a second thresholds;
when a variation of the availability of the potential resource aggregation of resources concerning one or more cells controlled by the second radio network node has passed a first threshold or is between a first and a second threshold;
when the variation of the availability of the potential resource aggregation of resources concerning one or more cells controlled by the second radio network node is between a first and a second threshold;
when the variation of the availability of the potential resource aggregation of resources concerning one or more cells controlled by the second radio network node is within any pre-configured thresholds defining ranges of available resources;
when a type of supported aggregation level has changed;
when a type of supported multi-connectivity has changed; and
periodically at a reporting periodicity agreed between the first radio network node and the second radio network node.

9. The method according to claim 7, further comprising one or more of the following:
receiving, from the first radio network node, at least one reporting periodicity to be used by the second radio network node to send periodic updates on availability of potential resource aggregation of resources concerning one or more cells controlled by the second radio network node; and
sending, to the first radio network node, a reporting periodicity selected by the second radio network node.

10. A first radio network node configured for handling communication in a wireless communication network, wherein the first radio network node comprises:
communication interface circuitry configured to communication with a second radio network node in the wireless communication network; and
processing circuitry operably coupled to the communication interface circuitry, whereby the processing circuitry and the communication interface circuitry are configured to:
transmit, to the second radio network node, a request for retrieval of an update indication of measurement upon a potential resource aggregation of one or more cells controlled by the second radio network node,
receive the update indication from the second radio network node in response to the request, wherein the update indication includes resource status updates for at least one of the cells controlled by the second radio network node, wherein each resource status update for a cell is one of the following:
a list of cells controlled by the second radio network node that can be used for carrier aggregation and/or multi-connectivity for a user equipment (UE) handed over to that cell;
an index representing the availability of potential resources of the one or more cells when the overall set of resources is the one achievable via carrier aggregation and/or multi-connectivity among a group of cells for a UE handed over to that cell;
a list of cells and respective indexes representing the availability of potential resources of the one or more cells when the overall set of resources is the one achievable via carrier aggregation and/or multi-connectivity among a group of cells for a UE handed over to that cell;
an indication of the cells that can be used for carrier aggregation and/or multi-connectivity in a downlink (DL) direction, in an uplink (UL) direction, or in both DL and UL directions; or
an indication of a multi-connectivity type supported for that cell.

11. The first radio network node according to claim 10, wherein the request includes an indication of when the second radio network node should send the update indication, which is according to one or more of the following:
when an availability of the potential resource aggregation of resources concerning one or more cells controlled by the second radio network node has passed a first threshold;
when the availability of the potential resource aggregation of resources concerning one or more cells controlled by the second radio network node is between a first and a second thresholds;
when a variation of the availability of the potential resource aggregation of resources concerning one or more cells controlled by the second radio network node has passed a first threshold or is between a first and a second threshold;
when the variation of the availability of the potential resource aggregation of resources concerning one or more cells controlled by the second radio network node is between a first and a second threshold;
when the variation of the availability of the potential resource aggregation of resources concerning one or more cells controlled by the second radio network node is within any pre-configured thresholds defining ranges of available resources;
when a type of supported aggregation level has changed;
when a type of supported multi-connectivity has changed; and
periodically at a reporting periodicity agreed between the first radio network node and the second radio network node.

12. The first radio network node according to claim 10, wherein the processing circuitry and the communication interface circuitry are further configured to perform one or more of the following:
send, to the second radio network node, at least one reporting periodicity to be used by the second radio network node to send periodic updates on availability of potential resource aggregation of resources concerning one or more cells controlled by the second radio network node; and
receive, from the second radio network node, a reporting periodicity selected by the second radio network node.

13. A second radio network node configured for handling communication in a wireless communication network, wherein the second radio network node comprises:
communication interface circuitry configured to communication with a first radio network node in the wireless communication network; and
processing circuitry operably coupled to the communication interface circuitry, whereby the processing circuitry and the communication interface circuitry are configured to perform operations corresponding to the method of claim 6.

14. The second radio network node according to claim 13, wherein the request includes an indication of when the second radio network node should send the update indication, which is according to one or more of the following:
- when an availability of the potential resource aggregation of resources concerning one or more cells controlled by the second radio network node has passed a first threshold;
- when the availability of the potential resource aggregation of resources concerning one or more cells controlled by the second radio network node is between a first and a second thresholds;
- when a variation of the availability of the potential resource aggregation of resources concerning one or more cells controlled by the second radio network node has passed a first threshold or is between a first and a second threshold;
- when the variation of the availability of the potential resource aggregation of resources concerning one or more cells controlled by the second radio network node is between a first and a second threshold;
- when the variation of the availability of the potential resource aggregation of resources concerning one or more cells controlled by the second radio network node is within any pre-configured thresholds defining ranges of available resources;
- when a type of supported aggregation level has changed;
- when a type of supported multi-connectivity has changed; and
- periodically at a reporting periodicity agreed between the first radio network node and the second radio network node.

15. The second radio network node according to claim 13, wherein the processing circuitry and the communication interface circuitry are further configured to perform one or more of the following:
- receive, from the first radio network node, at least one reporting periodicity to be used by the second radio network node to send periodic updates on availability of potential resource aggregation of resources concerning one or more cells controlled by the second radio network node; and
- send, to the first radio network node, a reporting periodicity selected by the second radio network node.

\* \* \* \* \*